United States Patent
Yagisawa et al.

(10) Patent No.: US 7,040,294 B2
(45) Date of Patent: May 9, 2006

(54) FUEL PIPING

(75) Inventors: Katsuichi Yagisawa, Saitama (JP);
Katsunori Komuro, Saitama (JP);
Yasuaki Nagai, Saitama (JP);
Toshikazu Saito, Saitama (JP); Masaki Ueno, Saitama (JP); Minoru Ueda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/001,006

(22) Filed: Dec. 2, 2004

(65) Prior Publication Data

US 2005/0133010 A1 Jun. 23, 2005

(30) Foreign Application Priority Data

Dec. 5, 2003 (JP) ............................. 2003-407156

(51) Int. Cl.
*F02M 55/02* (2006.01)
(52) U.S. Cl. ...................................... 123/468; 123/469
(58) Field of Classification Search ................ 123/509, 123/468, 469
See application file for complete search history.

(56) References Cited

U.S. PATENT DOCUMENTS

| | | | | |
|---|---|---|---|---|
| 3,829,117 A | * | 8/1974 | Park ........................... | 180/291 |
| 4,367,705 A | * | 1/1983 | Oeth ...................... | 123/198 DB |
| 4,469,190 A | * | 9/1984 | Yamaguchi .................. | 180/219 |
| 4,799,569 A | * | 1/1989 | Hattori et al. .............. | 180/219 |
| 5,329,899 A | * | 7/1994 | Sawert et al. ......... | 123/198 DB |
| 5,346,034 A | * | 9/1994 | Knowlton et al. .......... | 180/298 |
| 5,476,080 A | * | 12/1995 | Brunnhofer .................. | 123/468 |
| 5,845,940 A | * | 12/1998 | Colburn ...................... | 280/830 |
| 6,074,719 A | * | 6/2000 | Fukushi et al. ............ | 428/36.9 |
| 6,216,908 B1 | * | 4/2001 | Hutter et al. ................ | 220/562 |
| 6,287,508 B1 | * | 9/2001 | Stripe .......................... | 264/570 |
| 6,641,169 B1 | * | 11/2003 | Fukunaga et al. .......... | 280/835 |
| 2004/0139947 A1 | * | 7/2004 | Serizawa et al. ........... | 123/468 |

FOREIGN PATENT DOCUMENTS

| | | | | |
|---|---|---|---|---|
| JP | 401266020 A | * | 10/1989 | ................ 280/834 |
| JP | 10-236365 | * | 9/1998 | |
| JP | 2003-214276 A | | 7/2003 | |

* cited by examiner

*Primary Examiner*—Thomas Moulis
(74) *Attorney, Agent, or Firm*—Birch Stewart Kolasch & Birch LLP

(57) ABSTRACT

To manufacture fuel piping for connecting a fuel tank and a drive unit including an engine using a resin material at a low cost and to cause the fuel piping to suitably follow the movement of the fuel tank and the drive unit when the vehicle is being operated. A fuel piping includes connectors at both ends of a pipe member formed of resin material into a thin tubular shape for connecting between a fuel tank and a fuel injection apparatus for supplying fuel to an engine of a two-wheel vehicle or the like via the connectors. One or more bent portions are formed at the midsection of the pipe member of the fuel piping.

20 Claims, 12 Drawing Sheets

FUEL PIPING

CROSS-REFERENCE TO RELATED APPLICATIONS

The present application is related to Japanese Patent Application No. 2003-407156 filed on Dec. 5, 2003 the entire contents of which are hereby incorporated by reference.

BACKGROUND OF THE INVENTION

1. Field of the Invention

The present invention relates mainly to fuel piping for connecting a fuel tank of a vehicle such as a motorcycle or the like and a drive unit including an engine.

2. Description of Background Art

In the related art, in vehicles such as a motorcycle, a four-wheel buggy, or the like, fuel piping is employed for connecting a fuel tank having a fuel port for storing fuel such as gasoline therein and a fuel supply mechanism for supplying the fuel to an engine. See, for example, JP-A-2003-214276.

In such vehicles, since a fuel system including the fuel piping and the fuel supply mechanism is positioned to be covered by the fuel tank, it is necessary to dismount the fuel tank when performing maintenance of the fuel system. In this case, since the dismounting work of the fuel tank is performed in a state in which the fuel piping is connected to the fuel tank, it is generally required that the fuel piping has flexibility, taking performance of assembling and maintenance into consideration.

Therefore, since the fuel piping is formed of rubber material having flexibility, a tensile strength or the like exerted on the fuel piping is absorbed, for example, when dismounting the fuel tank.

However, since the rubber material employed in the fuel piping as in the related art according to JP-A-2003-214276 is required to have a desired flexibility and a capability to resist high pressure from fuel flowing therein, the cost is high. Thus, a problem arises in that the manufacturing cost of the fuel piping increases.

Forming the fuel piping with resin material, which is lower in cost, instead of costly rubber material is conceivable. However, in such a case, since the resin material is low in flexibility in comparison with the rubber material, the flexibility of the layout of the fuel piping may be limited due to a tensile strength or the like exerted on the fuel piping during the maintenance work.

SUMMARY AND OBJECTS OF THE INVENTION

In view of such various problems described above, it is an object of the present invention to provide fuel piping which can be formed of resin material at a low cost which can be caused to follow the fuel tank and the drive unit when moved suitably.

In order to achieve the object described above, the present invention provides fuel piping connected between a fuel tank which is supported so as to be capable of tilting in the direction away from the body about one end as a fulcrum and a drive unit including an engine in a vehicle, wherein the fuel piping includes a pipe member formed of flexible resin material so as to be capable of bending and a connecting portion provided at the end of the pipe member for connecting the fuel tank and the drive unit.

According to the present invention, since the fuel piping for connecting the drive unit including the engine and the fuel tank is formed of flexible resin material so as to be capable of bending freely, even when the fuel tank or the drive unit to which the end of the fuel piping is connected is displaced, the fuel piping can be displaced suitably while following the displacement of the fuel tank or the drive unit.

Therefore, even in the case where the fuel tank or the drive unit is displaced, since a force exerted from the fuel tank or the drive unit to the fuel piping can suitably be absorbed, the durability of the fuel piping can be improved.

Also, since the fuel piping is formed of a resin material, it can be manufactured at a lower cost as compared to fuel piping that is formed of resilient material such as rubbery material. Thus, the manufacturing cost can be reduced.

In addition, in the vehicle, the drive unit is mounted so as to be swingable with respect to the body and the pipe member is bent so as to follow the swinging movement of the drive unit. In other words, the drive unit is configured in such a manner so that the drive unit swings with respect to the body by input from the road surface while the vehicle is traveling. Therefore, the fuel piping connected between the fuel tank and the drive unit is displaced at the end connected to the drive unit when the drive unit swings.

In this case as well, according to the present invention, since the fuel piping is formed of flexible resin material, the fuel piping suitably follows the swinging movement of the drive unit. As a consequence, an unnecessary load may be prevented from being generating at the fuel piping.

Furthermore, by providing a bent portion, which is bent by molding, on the pipe member, and providing the bent portions at one or more positions on the pipe member, when the fuel tank to which the end of the fuel piping is connected is dismounted, or when the drive unit is swung, the bent portion performs a spring action. Thus, a force exerted on the fuel piping can suitably be absorbed. Accordingly, the fuel piping can be caused to follow the displacement of the fuel tank occurring at the time of dismounting to work on the vehicle or during a swinging motion of the drive unit. Thus, an unnecessary load is suitably prevented from generating at the fuel piping.

Furthermore, by forming the pipe member of the thermoplastic resin material and forming the piping member so as to have an outer diameter not more than 7 mm, the flexibility of the pipe member formed of the resin material can further be improved. In addition, the flexibility of the layout of the fuel piping in the vehicle can be increased. Thus, the fuel piping can be caused to follow the displacement of the fuel tank at the time of the dismounting to work on the vehicle, or during a swinging motion or the like of the drive unit.

According to the present invention, the following effects are achieved.

In other words, since the fuel piping for connecting the drive unit and the fuel tank is formed of flexible resin material so as to be capable of bending, even when the fuel tank or the drive unit is displaced, the fuel piping can be caused to follow the displacement. Thus, a force exerted from the fuel tank or the drive unit to the fuel piping can suitably be absorbed so that durability of the fuel piping can be improved.

Also, since the fuel piping is formed of resin material, the fuel piping can be manufactured at a lower cost as compared to fuel piping that is formed of rubber material. Thus, the manufacturing cost can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the attached drawings, preferred embodiments of fuel piping according to the present invention will be described in detail below.

Figure 1:
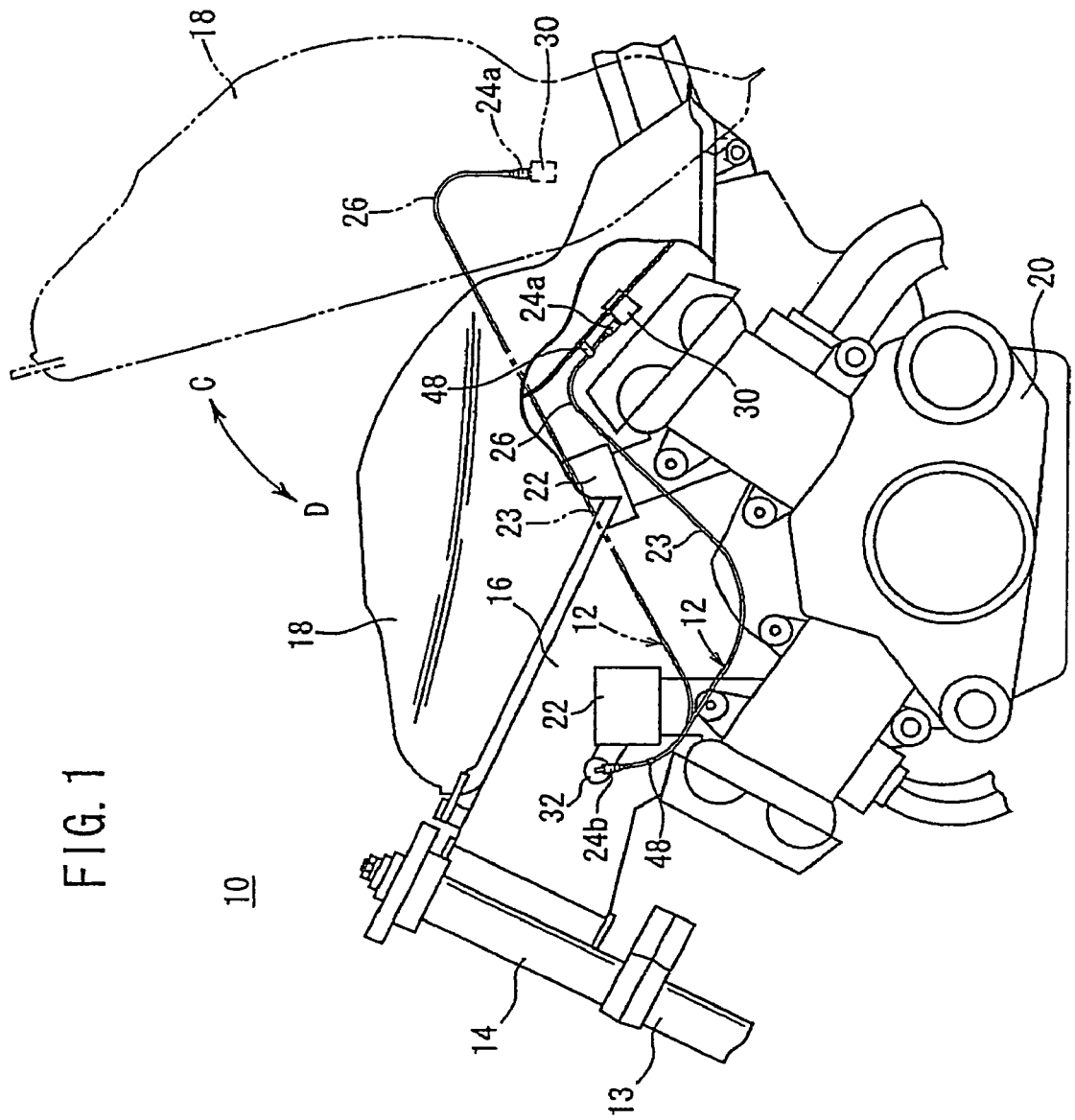
FIG. 1 is a side view, partly omitted, of a two-wheel vehicle, to which a fuel piping according to a first embodiment of the present invention is applied.

In FIG. 1, a two-wheel vehicle 10 is illustrated in which fuel piping 12 according to a first embodiment of the present invention is applied.

As shown in FIG. 1, the two-wheel vehicle 10 includes a main frame or body 16 secured to a head pipe 14 which retains a steering shaft 13. A fuel tank 18 is disposed above the main frame 16 for storing fuel such as gasoline. A fuel injection apparatus 22 is provided for injecting fuel by a desired amount into an engine 20 mounted substantially at the center of the main frame 16. The fuel piping 12 is provided for connecting the fuel tank 18 and the fuel injection apparatus 22. The engine 20 and the fuel injection apparatus 22 are integrally provided, and function as a drive unit for supplying a drive force to a wheel of the two-wheel vehicle, not shown.

A pump (not shown) is provided inside the fuel tank 18 for pumping fuel in the fuel tank 18 to the fuel injection apparatus 22 via the fuel piping 12.

The fuel piping 12 includes a pipe member 23 formed of resin material (nylon, for example) into a tubular shape. Fuel, such as gasoline, flows within the pipe member 23. Connectors (connecting members) 24a, 24b are provided at both ends of the pipe member 23 and are connected to the fuel tank 18 and to the fuel injection apparatus 22, respectively.

The fuel piping 12 is formed into a length suitable for connecting between the fuel tank 18 and the fuel injection apparatus 22. The fuel piping 12 is formed with a bent portion 26 formed by bending the pipe member 23 at one or more positions along the midsection of the pipe member 23. The fuel piping 12 is formed to have a length longer than the case of connecting the fuel tank 18 and the fuel injection apparatus 22 linearly. Thus, the fuel piping 12 is connected in a bent state.

Since the pipe member 23 of the fuel piping 12 is formed of fuel-resistant thermoplastic resin material, the formability is preferably as compared with forming the pipe member 23 of resilient material such as rubber. Therefore, the pipe member 23 may be formed entirely to a desired shape without forming only the bent portion 26 by bending.

Furthermore, the pipe member 23 of the fuel piping 12 is formed to have a constant outer diameter from one end to the other end. More specifically, the pipe member 23 is formed to have an outer diameter not more than 7 mm. It is more preferable to form the pipe member 23 to have an outer diameter not more than 5 mm.

Figure 2:
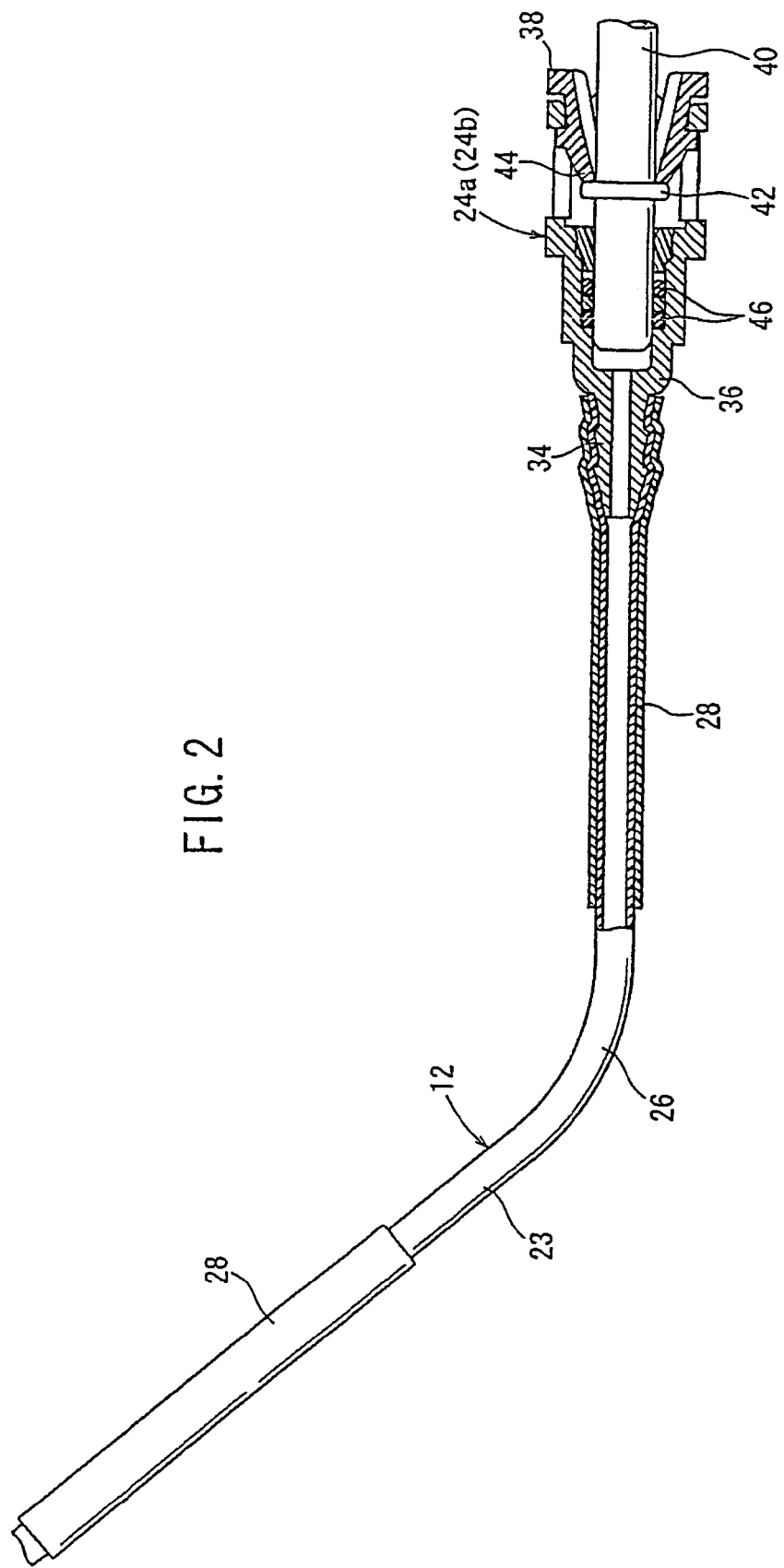
FIG. 2 is a plan view, partly in cross-section, showing a case in which a coating layer coated by a resilient member is formed on the outer periphery of the fuel piping in FIG. 1.

In this case, as shown in FIG. 2, the outer peripheral surface of the pipe member 23 that formed of the resin material may be coated by a coating layer 28 formed of resilient material, for example, rubber. In other words, by covering the pipe member 23 with a resilient material, the pipe member 23 can be protected from battery liquid at the time of maintenance or from acid rain during operation of the vehicle, so that deterioration of the durability of the fuel piping 12 can be prevented.

The coating layer 28 may be provided on the pipe member 23 entirely from one end to the other end. Alternatively, the coating layer 28 may be provided only partly as needed as shown in FIG. 2.

Furthermore, the pipe member 23 that is formed of the resin material may be formed with a fluorine-contained rubber layer so as to cover the inner peripheral surface thereof. In other words, by coating the inner peripheral surface of the pipe member 23 by the fluorine-containing rubber layer, in the case where gasoline (sour gasoline) having a large amount of sulfur flows in the pipe member 23, the fluorine-containing rubber layer can protect the pipe member 23 from the gasoline. Thus, the deterioration of the durability of the fuel piping 12 is prevented.

As shown in FIG. 1, one connector 24a is provided at one end of the fuel piping 12 so as to project below the fuel tank 18. The connector 24 is connected to a first joint 30 which is in communication with the interior of the fuel tank 18. The other connector 24b provided at the other end of the fuel piping 12 is connected to a second joint 32 which is in communication with the interior of the fuel injection apparatus 22.

Figure 3:
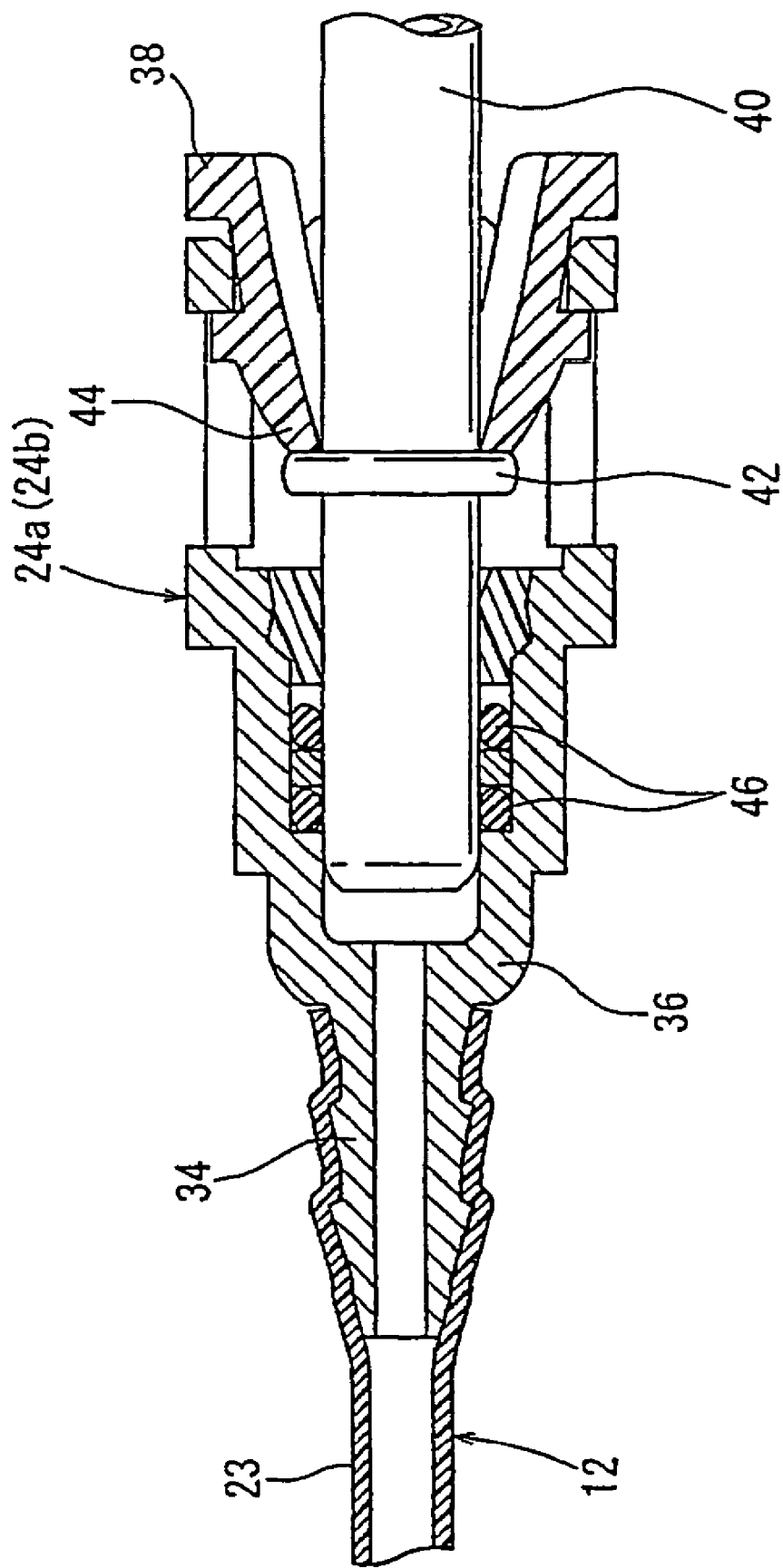
FIG. 3 is a vertical cross-sectional view, partly omitted, of a portion in the vicinity of a connector which is connected to the end of the fuel piping in FIG. 1.

The connectors 24a, 24b each include a housing 36 having a connecting portion 34 that fits the end of the pipe member 23 and connects the same. A retainer 38 is provided at the other end of the housing 36 as shown in FIG. 3. When connecting the fuel piping 12 to the fuel tank 18 and the fuel injection apparatus 22 via the connectors 24a, 24b, since a pipe 40 of the first and second joints 30, 32 is inserted into the interior of the housing 36 via the retainer 38, and a wider diameter portion 42 of the pipe 40 is engaged to a claw 44 of the retainer 38, the first and second joints 30, 32 and the fuel piping 12 are integrally connected via the connectors 24a, 24b. In this case, the pipe 40 is prevented from being disconnected from the connectors 24a, 24b due to the engaging action of the wider diameter portion 42.

Also, when the pipe 40 of the first and second joints 30, 32 is inserted into the interior of the housing 36, a liquid-tight property of the interiors of the connectors 24a, 24b are suitably maintained by the outer peripheral surface of the pipe 40 abutting against a sealing member 46 provided along the inner peripheral surface of the housing 36.

Since the fuel piping 12 is formed into a thin tubular shape so as to have flexibility, when the fuel piping 12 is disposed between the fuel tank 18 and the fuel injection apparatus 22, the channel can be varied freely. More specifically, the fuel piping 12 is flexibly provided between one end connected to the first joint 30 via one of the connectors 24a, 24b and the other end connected to the second joint 32 via the other connectors 24a, 24b. Therefore, a plurality of retaining clamps 48 are mounted to the midsection of the fuel piping 12, so that the retaining clamp 48 hogties the channel of the fuel piping 12.

The retaining clamp 48 is, as shown in FIG. 4 to FIG. 7, attached to a plate-shaped supporting bracket 50 provided at a desired position, where the channel of the fuel piping 12 is desired to be hogtied. The supporting bracket 50 is fixed to another member, not shown.

The retaining clamp 48 includes a cylindrical inserting portion 52 through which the pipe member 23 of the fuel piping 12 is inserted, a substantially circular flange member 54 that is formed adjacent to the inserting portion 52 that comes into abutment with the end surface of the supporting bracket 50, and pin portions 56 projecting from the end surface of the flange member 54 in the direction away from the inserting portion 52.

Figure 5:
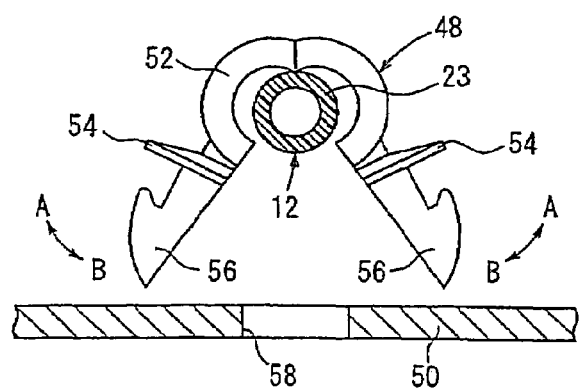
FIG. 5 is a movement chart illustrating the operation in a state in which the retaining clamp in FIG. 4 is tilted in the direction away from each other with an inserting portion as a fulcrum, and the fuel piping is disposed in the inserting portion.
Figure 6:
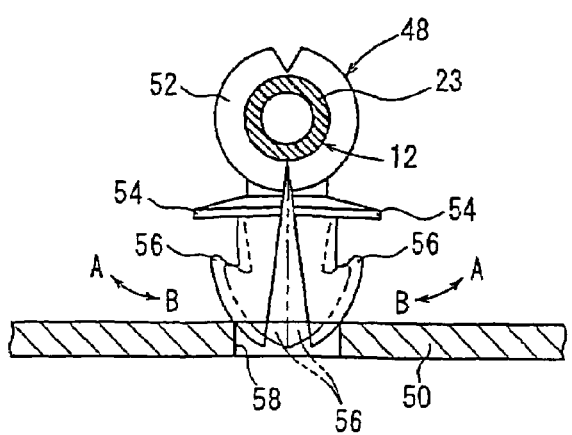
FIG. 6 is a movement chart illustrating the operation in a state in which pin portions of the retaining clamp in FIG. 5 are inserted into a hole on the supporting bracket while being displaced toward each other.

As shown in FIG. 5 and FIG. 6, the retaining clamp 48 is formed so as to be capable of tilting towards and away from the inserting portion 52 about the axis as a fulcrum as indicated by arrows A and B. The pin portions 56 are formed into a substantially symmetrical bifurcated shape which moves apart from each other by a predetermined distance with respect to the axis when moved towards each other with the inserting portion 52 of the retaining clamp 48 as a fulcrum, see FIG. 6.

When retaining the fuel piping 12 on the supporting bracket 50 via the retaining clump 48, the supporting clamp 48 is first tilted in the direction apart from each other, in the direction indicated by the arrow A, with the inserting portion 52 as a fulcrum as shown in FIG. 5. Then the pipe member 23 of the fuel piping 12 is disposed within the insertion portion 52. The retaining clamp 48 is in a state in which the pin portions 56 are spaced apart from each other is moved so that the pin portions are move toward each other, in the direction indicated by the arrow B, and the pipe member 23 is retained in the interior of the inserting portion 52, see FIG. 6.

Subsequently, as shown in FIG. 6, the pin portions 56 in the bifurcated shape are moved towards each other and are inserted into a hole 58 on the bracket 50 (the shape shown by a chain double-dashed line). Then, the pin portions 56 inserted into the hole 58 of the supporting bracket 50 are moved apart from each other again due to the resilient force after having being inserted into the hole 58 and is opened to a distance larger than the diameter of the hole 58. Therefore, the supporting bracket 50 is retained between the flange member 54 abutting against the end surface of the supporting bracket 50 and the pin portions 56, see FIG. 7.

Figure 4:
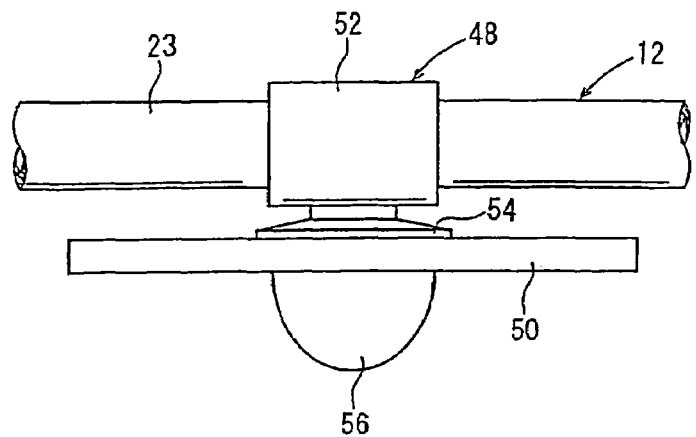
FIG. 4 is a side view, partly omitted, illustrating a state in which the fuel piping is retained by a supporting bracket via a retaining clamp shown in FIG. 1.
Figure 7:
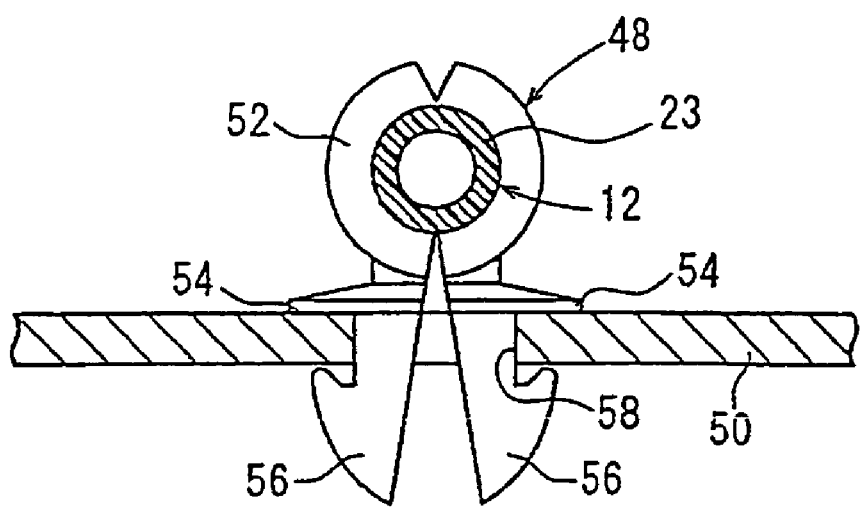
FIG. 7 is a movement chart illustrating the operation in a state in which the pin portions of the retaining clamp in FIG. 6 are inserted and fixed in the hole on the supporting bracket.

Accordingly, the fuel piping 12 is retained by the supporting bracket 50 via the retaining clamp 48 and the channel of the fuel piping 12 is hogtied by the retaining clamp 48, see FIG. 4 and FIG. 7.

Subsequently, retaining clamps 60, 64 according to first and second modifications will be described. The identical components as in the retaining clamp 48 described above will be represented by the identical reference numbers and the detailed description will be omitted.

Figure 8:
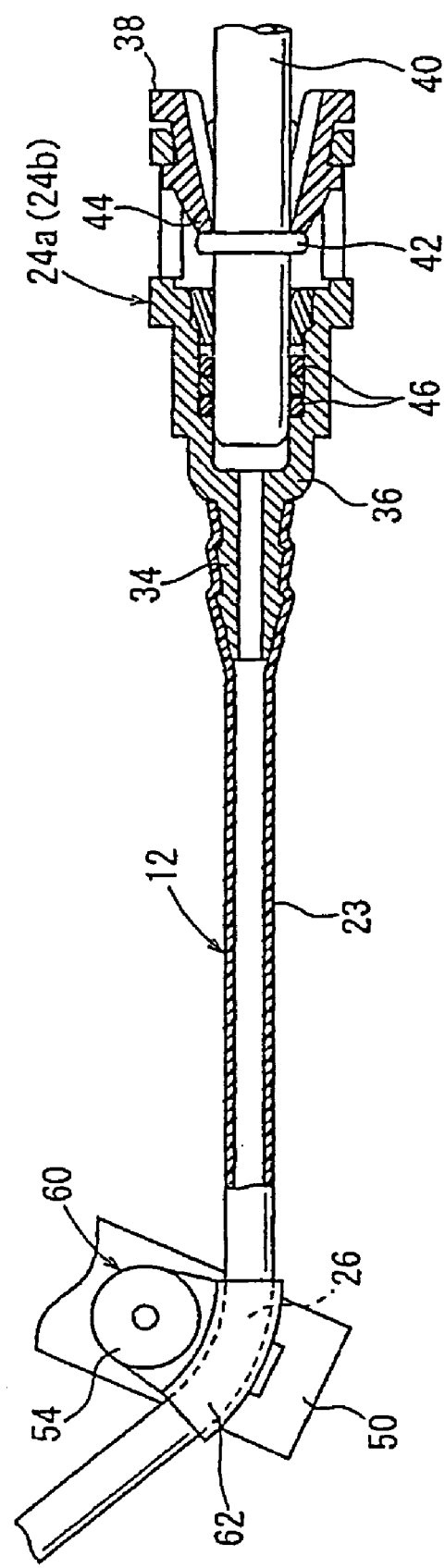
FIG. 8 is a plan view, partly omitted, of the fuel piping to which the retaining clamp according to a first modification is mounted.
Figure 9:
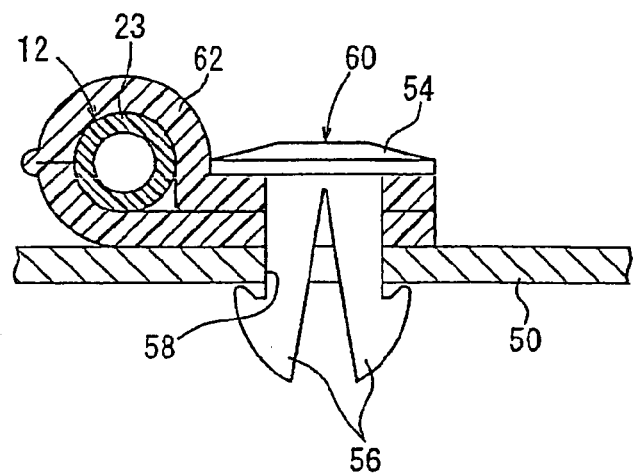
FIG. 9 is a vertical cross-sectional view of the retaining clamp shown in FIG. 8.

In the first modification, as shown in FIG. 8 and FIG. 9, an inserting portion 62 through which the pipe member 23 of the fuel piping 12 is inserted is formed on the side of the pin portions 56, see FIG. 9, to be inserted into the supporting bracket 50 and the flange member 54 that comes into abutment with the end surface of the supporting bracket 50. The inserting portion 62 formed in a cylindrical shape has an arcuate shape of a predetermined radius when viewed in the direction of mounting the retaining clamp 60 to the supporting bracket 50, see FIG. 8.

In this structure, when the pipe member 23 is formed of resin material and is inserted into the interior of the inserting portion 62, since the pipe member 23 has a thin tubular shape and flexibility, the pipe member 23 can be bent along the shape of the inserting portion 62 formed into an arcuate shape at a predetermined radius. Therefore, the bent portion 26 can be formed easily on the fuel piping 12 without performing a bending process on the fuel piping 12 in advance.

Figure 10:
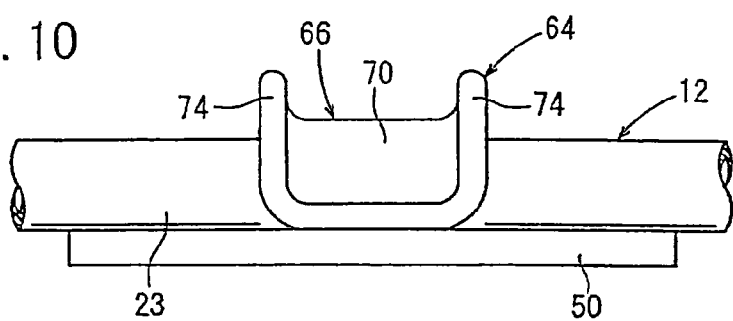
FIG. 10 is a side view, partly omitted, showing a state in which the fuel piping is retained by the supporting bracket via the retaining clamp according to a second embodiment.
Figure 11:
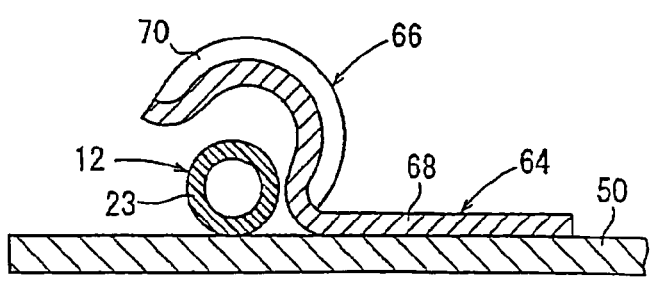
FIG. 11 is a movement chart illustrating the operation in the state in which the clamping portion of the retaining clamp in FIG. 10 is moved away from the supporting bracket and the fuel piping is disposed at the position opposing to the clamping portion of the supporting bracket.
Figure 12:
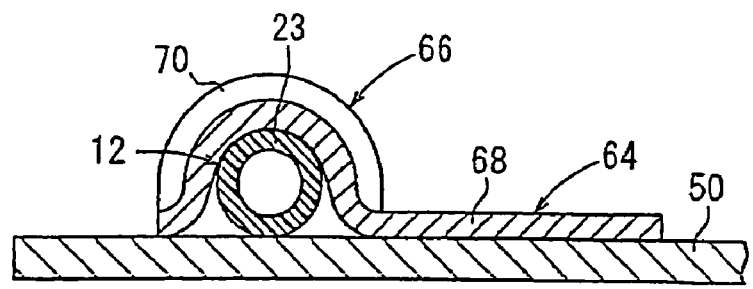
FIG. 12 is a movement chart illustrating the operation in a state in which the clamping portion of the retaining clamp in FIG. 11 is rotated, and the fuel piping is retained within the clamping portion.

Subsequently, as shown in FIG. 10 to FIG. 12, the retaining clamp 64 according to the second modification includes a retaining member 66 formed of a metal material and mounted integrally to the end surface of the supporting bracket 50. The fuel piping 12 is retained by the supporting bracket 50 via the retaining member 66.

The retaining member 66 includes a flat portion 68 secured to the supporting bracket 50 as shown in FIG. 10, and an arcuate clamping portion 70 formed in the direction away from the supporting bracket 50 formed at the end of the flat portion 68.

When causing the fuel piping 12 to be retained by the retaining clamp 64, as shown in FIG. 11, the pipe member 23 of the fuel piping 12 is disposed at the end surface of the supporting bracket 50 which opposes the clamping portion 70 in a state in which the clamping portion 70 is kept apart from the supporting bracket 50.

Subsequently, by rotating the clamping portion 70 toward the supporting bracket 50 with the joint portion with respect to the flat portion 68 as a fulcrum, the end of the clamping portion 70 comes into abutment with the supporting bracket 50 and the pipe member 23 is stored between the clamping portion 70 and the supporting bracket 50, see FIG. 12.

In this manner, it is also possible to hogtie the channel of the fuel piping 12 using the aforementioned retaining clamp 64 instead of inserting the fuel piping 12 into the inserting portion 52 by the retaining clamp 48 shown in FIG. 4 to FIG. 7, and then engaging the pin portions 56 with the supporting bracket 50.

Figure 13:
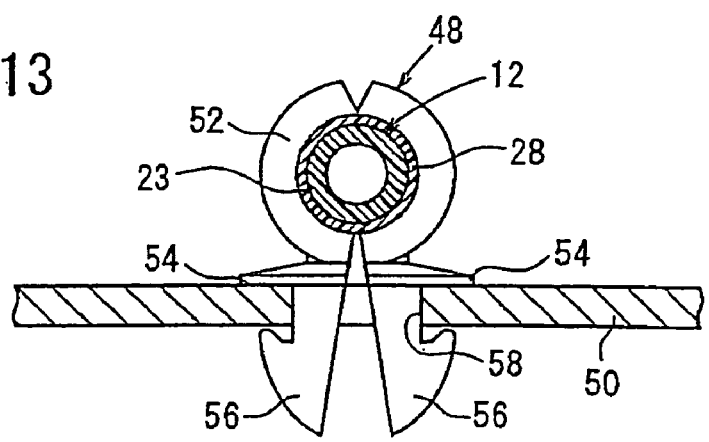
FIG. 13 is a vertical cross-sectional view showing a state in which the fuel piping formed with a coating layer on the outer peripheral surface thereof is retained by the retaining clamp.
Figure 14:
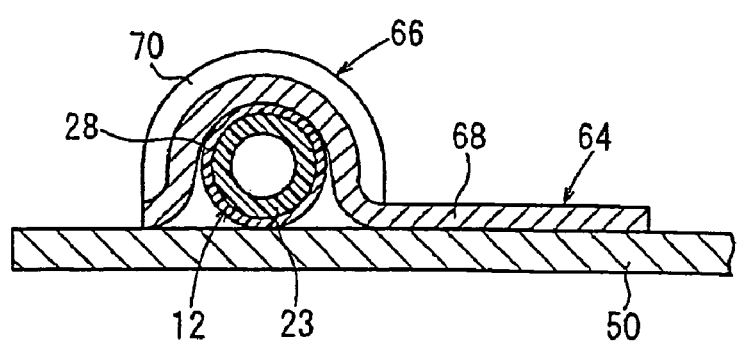
FIG. 14 is a vertical cross-sectional view showing a state in which the fuel piping formed with the coating layer on the outer peripheral surface thereof is retained by the retaining clamp according to the second modification.
Figure 15:
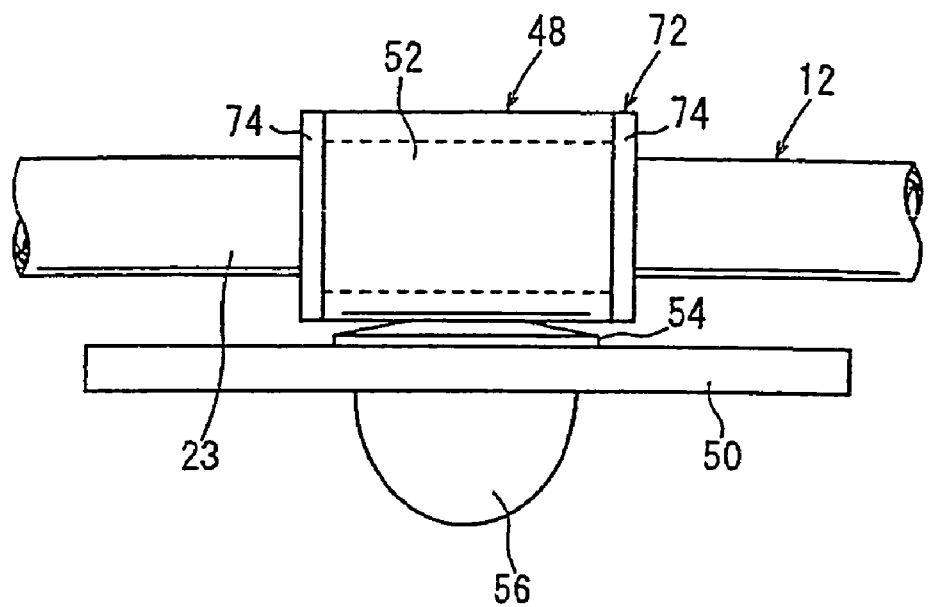
FIG. 15 is a side view, partly omitted, illustrating a state in which a tubular member is attached to the fuel piping and the tubular member is retained by the retaining clamp.
Figure 16:
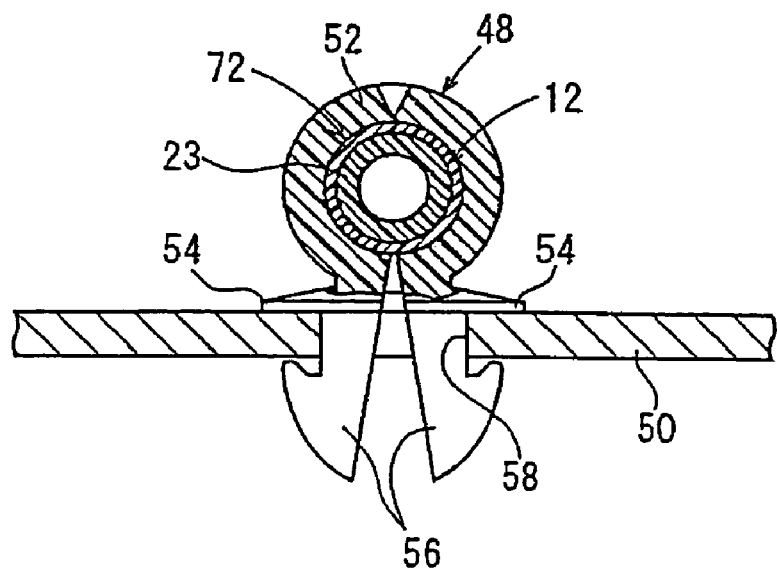
FIG. 16 is a vertical cross-sectional view of the fuel piping to which the tubular member shown in FIG. 15 is attached.
Figure 17:
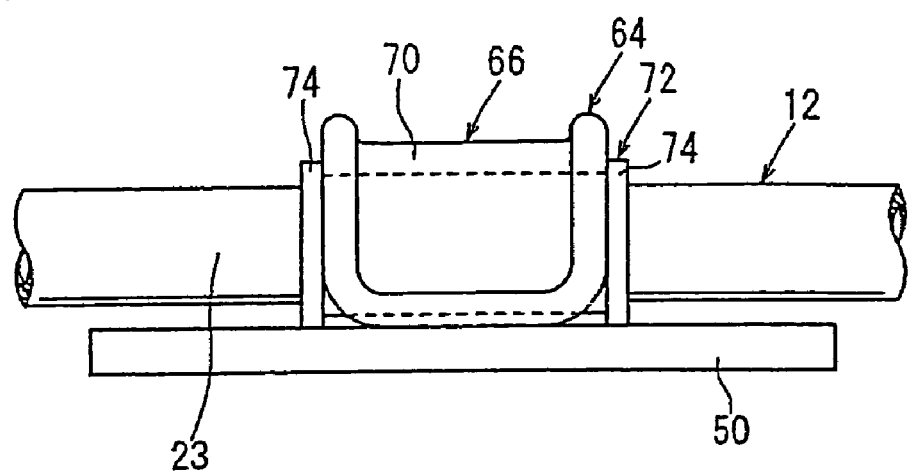
FIG. 17 is a side view, partly omitted, illustrating a state in which the tubular member is attached to the fuel piping and the tubular member is retained by the retaining clamp according to the second modification.
Figure 18:
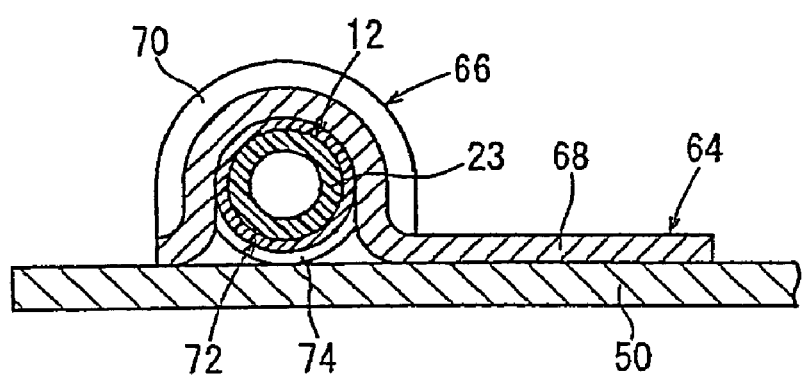
FIG. 18 is a vertical cross-sectional view of the fuel piping to which the tubular member shown in FIG. 17 is attached.

Also, in a state in which the coating layer 28 formed of resilient material is formed on the outer peripheral surface of the fuel piping 12 shown in FIG. 13, and FIG. 14, the fuel piping 12 is inserted into the inserting portion 52 of the retaining clamp 48 or the clamping portion 70 of the retaining clamp 64 to fix the retaining clamp 48 to the supporting bracket 50.

Accordingly, since the coating layer 28 formed of resilient material is lower in hardness than the pipe member 23 formed of resin material, when the pipe member 23 is inserted into the retaining clamps 48, 64, the inner peripheral surface of the inserting portion 52 of the retaining clamp 48 and the inner peripheral surface of the clamping portion 70 of the retaining clamp 64 engages the coating layer 28 in close contact. Consequently, since the fuel piping 12 is prevented from being displaced in the axial direction in the inserting portion 52 in the retaining clamp 48 or in the clamping portion 70 of the retaining clamp 64, the channel of the fuel piping 12 connected between the fuel tank 18 and the fuel injection apparatus 22 can be reliably hogtied.

In addition, as shown in FIG. 15 to FIG. 18, by inserting the pipe member 23 of the fuel piping 12 and retaining a cylindrical tubular member 72 secured integrally with the pipe member 23 by the retaining clamps 48, 64, when the fuel piping 12 is apt to displace in the inserting portion 52 of the retaining clamp 48 or in the clamping portion 70 of the retaining clamp 64, the fuel piping 12 is locked to the retaining clamp 48 via a stopper 74 of the tubular member 72 secured to the fuel piping 12. Therefore, displacement of the fuel piping 12 in the axial direction is hogtied. Thus, the channel of the fuel piping 12 connected between the fuel tank 18 and the fuel injection apparatus 22 can be reliably hogtied.

The two-wheel vehicle 10, to which the fuel piping 12 according to the embodiment of the present invention is applied, is basically configured as described above. Subsequently, a case in which the fuel tank 18 to which one end of the fuel piping 12 is connected is dismounted from the main frame 16 for maintenance of the two-wheel vehicle 10 will be described.

First, as shown in FIG. 1, a mounting bolt, not shown, for fixing the fuel tank 18 is removed, and the fuel tank 18 is tilted upwardly, in the direction indicated by an arrow C, with the rear end thereof, with respect to the two-wheel vehicle 10, being used as a fulcrum, see chain double-dashed line in FIG. 1.

In this situation, one end of the fuel piping 12 is connected to the lower side of the fuel tank 18 via the first joint 30. However, since the fuel piping 12 is formed of resin material into a thin tubular shape and hence has flexibility, the other end of the fuel piping 12 is bent while following the movement of the fuel tank 18 in a state of being connected to the fuel injection apparatus 22 even when the fuel tank 18 is tilted. Therefore, it is not necessary to dismount the fuel piping 12 from the first joint 30 of the tank every time when the fuel tank 18 is removed for performing a maintenance operation.

In a state in which the fuel tank 18 is attached to the mainframe 16, by forming the entire fuel piping 12 into a shape which provides an optimal channel configuration, the formed fuel piping 12 is restored to the original channel shape again when the fuel tank 18 is tilted downwardly, in the direction indicated by an arrow D, with the rear side thereof with respect to the two-wheel vehicle 10 being used as a fulcrum for mounting again after dismounting the fuel tank 18 for maintenance work.

The fuel piping 12 described above is not limited to the two-wheel vehicle 10, and may be applied, as a matter of course, to vehicles having fuel tanks 18 and the engines 20 such as a four-wheel buggy.

As described above, by connecting the fuel tank 18 and the fuel injection apparatus 22 in the two-wheel vehicle 10 or the like, and then forming the fuel piping 12 for supplying fuel from the fuel tank 18 of resin material into a thin tubular shape, the fuel piping 12 is provided with flexibility. Thus, the fuel piping 12 can be freely bent. Therefore, as shown in FIG. 1 for example, even when the fuel tank 18 is tilted (moved) for being dismounted from the main frame 16 for maintenance work, the fuel piping 12 which is connected at one end to the fuel tank 18 can be bent so as to follow the movement of the fuel tank 18.

Accordingly, since an unnecessary load is exerted on the fuel piping 12, the durability of the fuel piping 12 can be improved. Simultaneously, the fuel piping 12 is not necessary to be removed when dismounting the fuel tank 18, whereby maintenanceability of the fuel tank 18 and the like can be improved.

Also, by providing the bent portion 26 bent by a bending process at one or more positions between one end and the other end of the fuel piping 12, the bent portion 26 functions as a spring mechanism when dismounting the fuel tank 18. Thus, a force exerted on the fuel piping 12 can suitably be absorbed.

Furthermore, since the fuel piping 12 is formed of resin material, the fuel piping 12 can be manufactured at a lower cost than in the case where the fuel piping 12 is formed of resilient material such as rubber as in the related art.

Moreover, since the pipe member 23 of the fuel piping 12 is formed of resin material and is formed into a thin tubular shape, the weight of the fuel piping 12 can be reduced and the fuel piping 12 can be recycled.

Still further, since the fuel piping 12 has flexibility, when the layout of the fuel piping 12 is completed between the fuel tank 18 and the fuel injection apparatus 22 of the two-wheel vehicle 10, the fuel piping 12 can be bent freely so that interference with other members provided in the vicinity of the fuel tank 18 and the fuel injection apparatus 22 can be avoided easily. In other words, the flexibility of the layout of the fuel piping 12 in the two-wheel vehicle 10 may be increased.

Also, since the flexible fuel piping 12 can be bent freely, the hogtied state of the channel of the fuel piping 12 by the retaining clamps 48, 60, 64 between the fuel tank 18 and the fuel injection apparatus 22 may be alleviated. Therefore, the number of retaining clamps 48, 60, 64 can be reduced. Since a force exerted on the retaining member 66 when the retaining clamps 48, 60, 64 retain the fuel piping 12 is small, the retaining clamps 48, 60, 64 may be downsized. Therefore, the cost of the retaining clamps 48, 60, 64 can be reduced.

In addition, by enabling the pipe member 23 of the fuel piping 12 to be freely bent, it is not necessary to bend the pipe member 23 by the bending process except for the bent portion 26. Thus, the manufacturing cost of the fuel piping 12 can be reduced.

On the other hand, by performing the bending process to achieve the entire pipe member 23 of the fuel piping 12 to have a desired channel shape, when the fuel tank 18 is removed from the main frame 16 and then is mounted again after maintenance work, the shape of the fuel piping 12 is preferably maintained owing to the above-described forming process. The fuel piping 12 is prevented from being displaced towards the portion between the fuel tank 18 and the main frame 16. Thus, such problems wherein the fuel piping 12 is caught between the fuel tank 18 and the main frame 16 can reliably be prevented.

Furthermore, for example, when comparing the pipe member 23 formed of resin material and the pipe member formed of rubber material having substantially the same inner diameter, the outer diameter of the pipe member 23 formed of resin material can be reduced with respect to the outer diameter of the pipe member formed of the rubber material. More specifically, for example, the outer diameter of the pipe member 23 formed of resin material can be reduced to a value on the order of 5 mm. Accordingly, flexibility of layout of the fuel piping 12 can be increased, and preferable layout of the fuel piping 12 can be done in a limited space within an engine room.

In addition, the plurality of retaining clamps 48, 60, 64 that hogtie the channel of the fuel piping 12 including the pipe member 23 or a plurality of covering members (not shown) to be mounted to the main frame 16 or the like can be downsized.

Moreover, since the surface area of the pipe member 23 is reduced as the outer diameter of the pipe member 23 is reduced, heat generated from the engine or the like can be restrained from being received by the surface of the pip member 23. Accordingly, the temperature rise of fuel that flows within the pipe member 23 due to heat from the engine or the like is prevented. Thus, the generation of vapor caused by a temperature rise of the fuel is prevented.

Also, since the inner diameter of the pipe member 23 is reduced as the outer diameter thereof is reduced, the flowing rate of fuel flowing in the pipe member 23 increases. Thus, the temperature rise of the fuel by the influence of heat generated in the periphery of the engine is prevented.

Accordingly, the generation of a vapor in association with the temperature rise of fuel is preferably prevented, and hence fuel supply via the fuel piping 12 can suitably be maintained.

Figure 19:
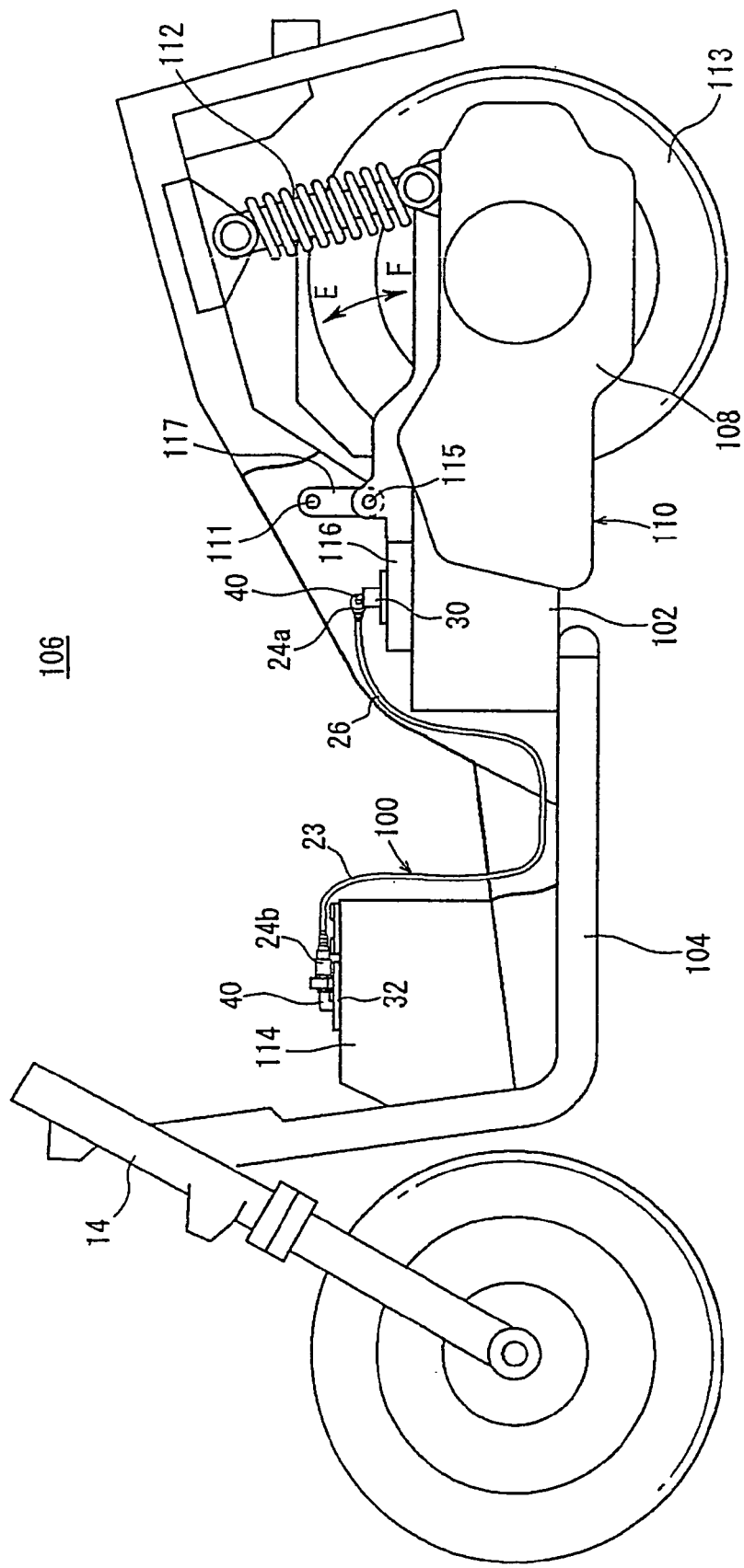
FIG. 19 is a side view, partly omitted, showing a two-wheel vehicle in which the fuel piping according to a second embodiment of the present invention is applied and a swinging unit including an engine is swingably supported.
Figure 20:
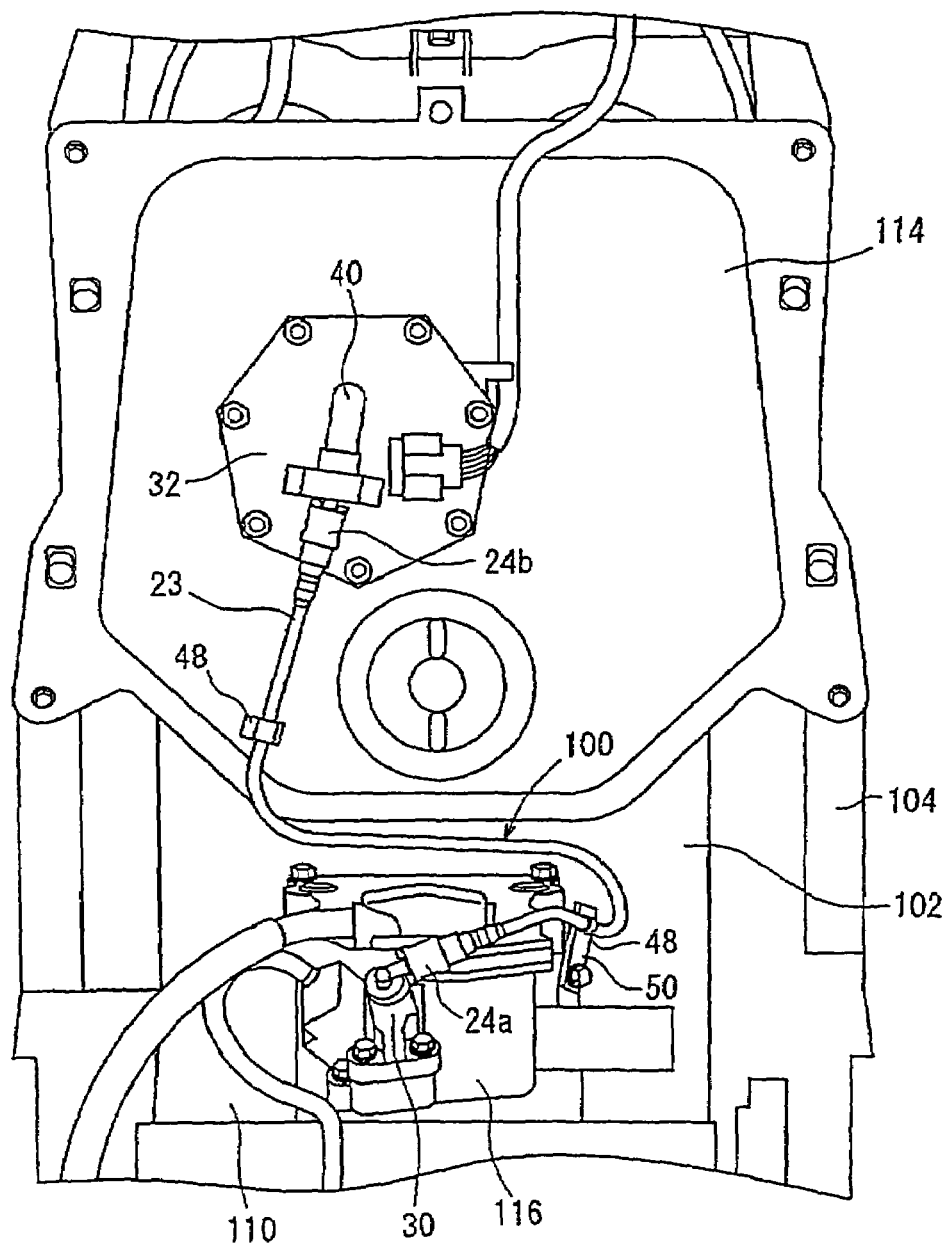
FIG. 20 is a partly enlarged plan view of a two-wheel vehicle to which the fuel piping shown in FIG. 19 is applied.

A two-wheel vehicle 106 to which a fuel piping 100 according to a second embodiment is applied and in which an engine 102 and the like are swingably provided on a main frame 104 is shown in FIG. 19 and FIG. 20. The components identical to the two-wheel vehicle 10 to which the fuel piping 12 according to the first embodiment described above is applied are represented by the identical reference numerals and the detailed description will be omitted.

In the two-wheel vehicle 106 to which the fuel piping 100 according to the second embodiment is applied, the engine 102 and a speed changer 108 are swingably supported as a swinging unit (drive unit) 110 by the main frame (body) 104. The other end of the swinging unit 110 is supported to the rear end of the main frame 104 via a suspension 112. The two-wheel vehicle 106 is provided with a rear wheel 113 so as to be capable of rotating freely via the speed changer 108 of the swinging unit 110.

When the two-wheel vehicle 106 is operated, the rear wheel 113 is displaced in the vertical direction due to the roughness on the road surface. The swinging unit 110 is swung and displaced (swinging movement) via a link arm 117 provided between a supporting pin 111 that is rotatably supported on the main frame 104 and a supporting portion 115 of the swinging unit 110. In other words, when the two-wheel vehicle 106 is being operated, the engine 102 is swung and displaced with respect to the main frame 104. A typical two-wheel vehicle 106 having such a structure is a scooter.

In the two-wheel vehicle 106 having the swinging unit 110, since a fuel tank 114, to which one end of the fuel piping 100 is connected, is fixed to the main frame 104 at the front of the vehicle, the fuel tank 114 is not displaced under the swinging motion of the swinging unit 110 even when the two-wheel vehicle 106 is traveling.

On the other hand, since a fuel injection apparatus 116, to which the other end of the fuel piping 100 is connected, is provided integrally with the upper portion of the engine 102, the fuel injection apparatus swings integrally with the swinging unit 110 when the two-wheel vehicle 106 is being operated. In other words, the end of the fuel piping 100 is connected to the fixed end, which is the fuel tank 114, and the other end thereof is fixed to the movable end, which is the fuel injection apparatus 116 that swings integrally with the engine 20.

Therefore, the fuel piping 100 is displaced at the other end under the swinging movement of the swinging unit 110. Thus, a force of expanding and contracting in the longitudinal direction is exerted on the fuel piping 100.

More specifically, for example, when the rear wheel 113 is displaced upwardly due to the roughness of the road surface, the swinging unit 110 is swung and displaced counterclockwise, in the direction indicated by an arrow E in FIG. 19, via the link arm 117 which is rotatably supported by the supporting pin 111 of the main frame 104. At this time, since the distance between the fuel tank 114 and the fuel injection apparatus 116 is reduced, the fuel piping 100 is displaced as if it contracts along the longitudinal direction of the fuel piping 100.

In contrast, when the rear wheel 113 is displaced downwardly due to the roughness of the road surface, the swinging unit 110 is swung and displaced clockwise in the direction indicated by an arrow F in FIG. 19, via the link arm 117 which is rotatably supported by the supporting pin 111 of the main frame 104. At this time, since the distance between the fuel tank 114 and the fuel injection apparatus 116 increases, the fuel piping 100 is displaced as if it is expanded along the longitudinal direction of the fuel piping 100.

In this case as well, since the fuel piping 100 is formed of a resin material into a thin tubular shape and has flexibility, an expanding and contracting force exerted on the fuel piping 100 under the swinging movement of the swinging unit 110 can be suitably absorbed by the bending movement of the fuel piping 100.

Also, since the bent portion 26 is provided at the midsection of the fuel piping 100 by a bending process, an expanding and contracting force exerted on the fuel piping 100 under the swinging movement of the swinging unit 110 can be suitably absorbed by the bent portion 26 having a spring function.

In this manner, by employing the fuel piping 100 formed of resin material to the two-wheel vehicle 106 provided with the swinging unit 110 including the engine 102 so as to be capable of a swinging movement with respect to the main frame 104, even when the swinging unit 110, to which the fuel piping 100 is connected, is displaced, a force exerted on the fuel piping 100 can be absorbed suitable. Thus, the durability of the fuel piping 100 can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel piping connected between a fuel tank being supported so as to be capable of tilting in a direction away from a body about one end as a fulcrum and a drive unit including an engine in a vehicle, wherein the fuel piping comprises:
    a pipe member formed of flexible resin material capable of bending; and
    a connecting portion provided at ends of the pipe member for connecting the fuel tank and the drive unit,
    wherein the pipe member has a downwardly curved portion extending below a level of the two connecting members.

2. The fuel piping according to claim 1, wherein the vehicle includes:
    the drive unit being attached to the body so as to be capable of a swinging motion; and
    the pipe member is bent following the swinging motion of the drive unit.

3. The fuel piping according to claim 1, wherein the pipe member comprises a bent portion bent by molding; and
    the bent portion is provided on the pipe member at one or more positions.

4. The fuel piping according to claim 2, wherein the pipe member comprises a bent portion bent by molding; and
    the bent portion is provided on the pipe member at one or more positions.

5. The fuel piping according to claim 1, wherein the pipe member is formed of thermoplastic resin material; and
    the pipe member is formed to so have an outer diameter of 7 mm or less.

6. The fuel piping according to claim 1, wherein the pipe member includes a coating layer formed of resilient material being formed over a predetermined length thereof.

7. The fuel piping according to claim 6, wherein the resilient material is rubber.

8. The fuel piping according to claim 1, wherein the pipe member is formed of a fuel-resistant thermoplastic resin material.

9. The fuel piping according to claim 1, wherein an interior surface of said pipe member is coated with a fluorine-contained rubber layer for protecting the pipe member from fuel supplied through the pipe member.

10. The fuel piping according to claim 1, and further including a retaining clamp including an inserting portion for engaging said pipe member and outwardly projecting pin portions for engaging with an aperture in a vehicle body for retaining the pipe member relative thereto.

11. A fuel piping adapted to be connected between a fuel tank and an engine in a vehicle, comprising:
    a pipe member formed of flexible resin material capable of bending freely for readily following a predetermined contour along a predetermined path for connecting a fuel tank to an engine;
    a proximal connecting portion provided at a proximal end of the pipe member for being operatively connected to a fuel tank; and
    a distal connecting portion provided at a distal end of the pipe member for being operatively connected to an engine, wherein the pipe member is capable of enduring a swinging action during operation of the vehicle,
    wherein the pipe member has a downwardly curved portion extending below a level of the two connecting members.

12. The fuel piping according to claim 11, wherein the vehicle includes:
    a drive unit being attached to a body so as to be capable of a swinging motion; and
    the pipe member is bent following the swinging motion of the drive unit.

13. The fuel piping according to claim 11, wherein the pipe member comprises a bent portion bent by molding; and
    the bent portion is provided on the pipe member at one or more positions.

14. The fuel piping according to claim 12, wherein the pipe member comprises a bent portion bent by molding; and
    the bent portion is provided on the pipe member at one or more positions.

15. The fuel piping according to claim 11, wherein the pipe member is formed of thermoplastic resin material; and
    the pipe member is formed to so have an outer diameter of 7 mm or less.

16. The fuel piping according to claim 11, wherein the pipe member includes a coating layer formed of resilient material being formed over a predetermined length thereof.

17. The fuel piping according to claim 16, wherein the resilient material is rubber.

18. The fuel piping according to claim 11, wherein the pipe member is formed of a fuel-resistant thermoplastic resin material.

19. The fuel piping according to claim 11, wherein an interior surface of said pipe member is coated with a fluorine-contained rubber layer for protecting the pipe member from fuel supplied through the pipe member.

20. The fuel piping according to claim 11, and further including a retaining clamp including an inserting portion for engaging said pipe member and outwardly projecting pin portions for engaging with an aperture in a vehicle body for retaining the pipe member relative thereto.

* * * * *